US006757301B1

(12) United States Patent
Tsai

(10) Patent No.: US 6,757,301 B1
(45) Date of Patent: Jun. 29, 2004

(54) DETECTION OF ENDING OF FAX/MODEM COMMUNICATION BETWEEN A TELEPHONE LINE AND A NETWORK FOR SWITCHING ROUTER TO COMPRESSED MODE

(75) Inventor: Chieh-Wen Tsai, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/524,799

(22) Filed: Mar. 14, 2000

(51) Int. Cl.[7] .............................. H04J 1/02; H04J 3/22

(52) U.S. Cl. .................... 370/493; 370/466; 379/93.09; 379/100.01

(58) Field of Search ................................ 370/352, 559, 370/395.5, 401, 402, 416, 466, 467, 487, 493, 596, 276–278; 379/902, 93.09, 100.01, 93.11; 375/326, 324, 354–355; 704/216

(56) References Cited

U.S. PATENT DOCUMENTS 4,672,669 A * 6/1987 DesBlache et al. ......... 704/237
5,295,223 A * 3/1994 Saito .......................... 704/214
5,911,128 A * 6/1999 DeJaco .................... 704/200.1
5,999,898 A * 12/1999 Richter ....................... 704/217
6,009,082 A * 12/1999 Caswell et al. ............. 370/276
6,041,227 A * 3/2000 Sumner ...................... 455/412
6,188,978 B1 * 2/2001 Harada ....................... 704/201
6,249,757 B1 * 6/2001 Cason ........................ 704/214
6,260,017 B1 * 7/2001 Das et al. ................... 704/265
6,275,502 B1 * 8/2001 Arimilli ...................... 370/468
6,278,775 B1 * 8/2001 Sih et al. ............... 379/100.17
6,381,570 B2 * 4/2002 Li et al. ..................... 704/233
6,490,556 B1 * 12/2002 Graumann et al. ......... 704/233
6,549,587 B1 * 4/2003 Li .............................. 375/326
6,556,967 B1 * 4/2003 Nelson et al. .............. 704/233
2001/0014857 A1 * 8/2001 Wang ......................... 704/231

* cited by examiner

*Primary Examiner*—Chi Pham
*Assistant Examiner*—John M. Waxman
(74) *Attorney, Agent, or Firm*—Marger Johnson & McCollom, PC

(57) ABSTRACT

A device is provided for coupling between a telephone line and the network, to exchange data between them. The invention includes software for the device, and methods of operation. The device detects when, in a fax/modem type transmission, the transmitted data encode silence or voice. This determines the end of the fax/modem type transmission, and then the device is switched to a more economical voice mode. The device analyzes the energy of the encoded signals. The device makes a discrimination of the type of signals (fax/modem, silence or voice) based on the time patterns of the energy. For fax/modem the pattern is relatively uniform, for silence it is uniformly low, and for voice the pattern oscillates.

8 Claims, 4 Drawing Sheets

DETECTION OF ENDING OF FAX/MODEM COMMUNICATION BETWEEN A TELEPHONE LINE AND A NETWORK FOR SWITCHING ROUTER TO COMPRESSED MODE

BACKGROUND OF THE INVENTION

1. Field of the Invention

The present invention is related to the field of communication of telephone type devices through networks, and more specifically to devices, software and methods for detecting an ending of a fax/modem communication between a telephone line and a network.

2. Description of the Related Art

Telephone type devices include telephones, fax machines, modems, and all such devices that can use telephone lines. Some telephone type devices exchange signals that encode voice, while others transfer data.

Telephone lines are increasingly being coupled with networks, such as Local Area Networks (LANs), or global networks. Networks are ideal for carrying data. The data of the telephone line is first changed to data that is transmissible through the network. When the telephone line is connected to a telephone, the data encodes voice. When the telephone line is connected to a fax machine or a modem, the data encodes the fax-type signals or the modem type signals.

A telephone line is typically connected with a network through a device, such as a gateway or a router. If the data encodes fax type signals or modem type signals, then the device preferably operates in the data transfer mode. Such a data transfer mode can be the standard pulse code modulation (PCM) mode. But if the data encodes voice, then the device preferably operates in a favored voice compression mode.

When a connection line is be used to transfer data, the connection can end normally if both parties hang up. Sometimes one of the parties does not hang up, causing the connection to continue to occupy the device of the party and/or telephone connection line. Worse, both of the parties might not hang up, which can also cause the connection to continue to occupy the connection line. This problem can be made more complex when one considers that the parties, after exchanging data, may start using the connection line for a voice conversation. In that case, the device will be operating in the data transfer mode, instead of operating in the compressed mode.

BRIEF SUMMARY OF THE INVENTION

The present invention overcomes these problems and limitations of the prior art.

Generally, the present invention provides devices, software, and methods for detecting when, in a fax/modem type transmission, the transmitted data encode silence or voice. This determines the end of the fax/modem type transmission, after which the device is switched to the more economical voice mode.

The device of the invention is a router or a gateway, coupled between the telephone line and the network. In its preferred embodiment, the device analyzes the energy of the encoded signals. The device discriminates between the type of signals (fax/modem, silence or voice) based on the time patterns of the energy. For fax/modem the pattern is relatively uniform, for silence it is uniformly low, and for voice the pattern oscillates.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, software, and methods. The device of the invention can include software according to the invention, which runs according to methods of the invention. These are now described in more detail with reference to the drawings.

Figure 1:
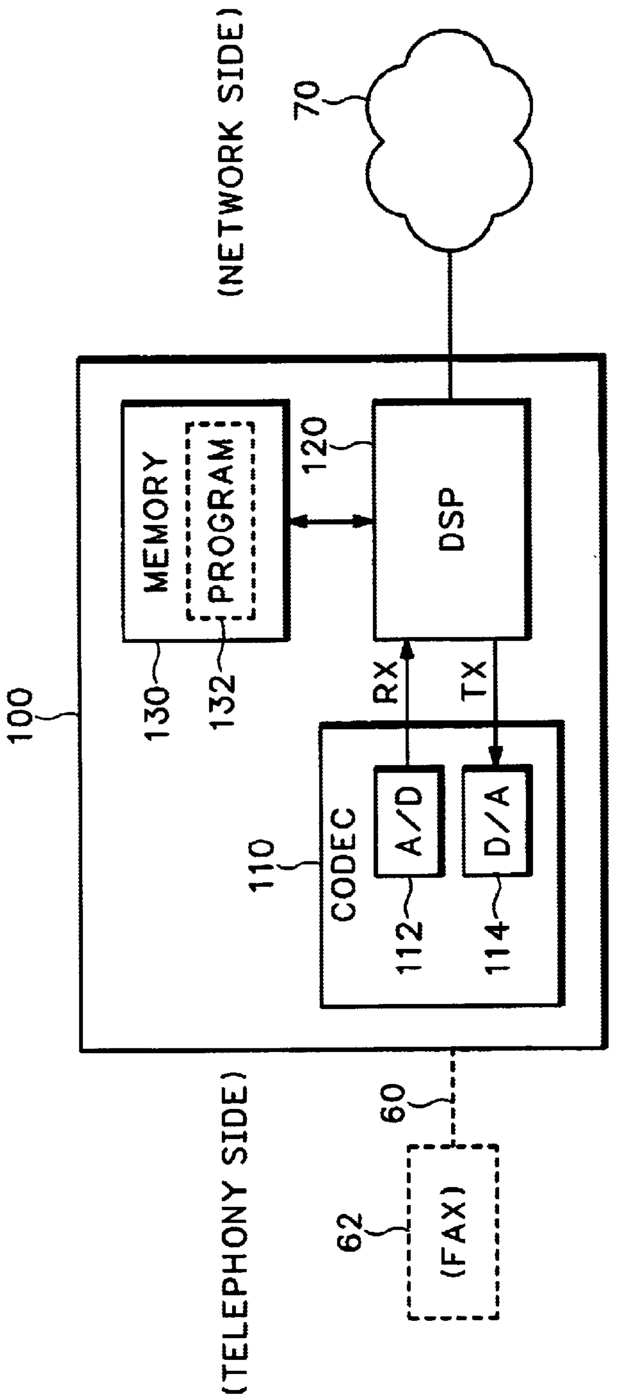
FIG. 1 is a block diagram of a device connected according to the present invention.

Referring now to FIG. 1, the invention provides a device 100. The device 100 of the invention is coupled between a telephone line 60 and a network 70 to exchange data between them. The telephone line 60 is coupled with a device 62. The device 62 can be a fax machine, a modem, or any other device that transmits data encoding signals other than voice signals. The device 62 it usually also has a telephone associated with it, which can be used with telephone line 60.

The device 100 of the invention can be a router, a gateway, etc. The device 100 of the invention is made as is otherwise known in the art, with the additional features described in this document. Only some of the features are shown, so as not to obscure the invention.

The device 100 of the invention includes a codec 110 for coupling to the telephone line 60. The codec 110, also known as coder-decoder 110, includes analog to digital (A/D) converter 112, and a digital to analog (D/A) converter 114.

The device 100 of the invention further includes a Digital Signal Processing (DSP) unit 120, that is coupled with the codec 110, and with the network 70. In the present description, the DSP unit 120 is intended to include a central processing unit (CPU) of the device 100, etc. The DSP unit 120 performs digital signal processing on the data RX and TX that it exchanges with the codec 110.

The device 100 of the invention has two operating modes, a PCM mode that is used with fax/modem data and a compressed mode that can be used with data encoding voice signals. Transmission and exchange of the data proceeds normally.

The device 100 of the invention in addition monitors the exchanged data. The device 100 of the invention detects when the transmitted data encode silence or voice, which signifies the end of the transmission of fax-type or modem-type data. This in turn permits switching the device to voice mode.

More particularly, the device 100 of the invention further includes a computer readable medium 130. The medium 130 is preferably a memory 130, which includes a program 132 according to the invention. The memory is accessed by the DSP unit 120. The program 132 is used by the DSP unit 120 for detecting when silence or voice are encoded in the data to be exchanged.

The program 132 is most advantageously implemented as a computer program that can be run by a router, a gateway, a specially configured computer etc. The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art. Often, for the sake of convenience only, it is preferred to implement and describe a program as various interconnected distinct software modules or features. This is not necessary, however. There may be cases where various softwares are equivalently aggregated into a single program with unclear boundaries.

In any event, the software modules or features of the present invention can be implemented by themselves, or in combination with others. Again, the combination can result in distinct software modules, or ones with blurred boundaries.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

As also described above, the present invention also relates to apparatus for performing these operations. This apparatus, such as the device 100, may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that the program of the invention need not reside in a single memory, such as memory 130, or even a single machine. Various portions, modules or features of it can reside in separate memories, of even separate machines. The separate machines may be connected directly, or through a network, such as a local access network (LAN), or a global network, such as what is presently known as Internet-1.

The program 132 of the invention is now described in more detail. The program includes an input for counting samples of the data to be exchanged. This means that, while the data includes bits that represent numbers, the values of these numbers are considered to be samples. The program counts the samples of the data. The data is typically provided in serially occurring frames, in which case the samples of a next frame are counted.

The program 132 of the invention also includes software that performs mathematical and logical operations on the samples. These operations determine when to switch the device 100 to the voice mode. As such, the whole device 100 of the invention performs these acts.

In a first embodiment, the software is for updating a quietness signal energy statistic of the data from the counted samples, and for incrementing a frames counter every time the quietness signal energy statistic remains below a preset threshold. The software is further for determining if the frames counter exceeds a preset frames counter threshold. The first embodiment of the software can include additional features, to further implement the methods of the invention described in this document. For example, the software further resets the frames counter if the quietness signal energy statistic exceeds the preset frames counter threshold.

In a second embodiment, the software is for updating a fast moving statistic and a slow moving statistic of the data, and for updating a difference between the fast moving statistic and the slow moving statistic. The software is further for incrementing a crossings counter, if the updated difference exceeds a preset threshold difference, and for determining whether the crossings counter exceeds a preset crossings counter threshold. The second embodiment of the software can include additional features, to further implement the methods of the invention described in this document. For example, the software further resets the crossings counter if the updated difference is below the preset crossings counter threshold difference.

In a third embodiment, the software includes features of both the first and the second embodiments.

The program 132 of the invention moreover includes an output for informing that voice has been detected if the software determines that the frames counter exceeds the preset frames counter threshold (the crossings counter exceeds the preset crossings counter threshold).

In all its embodiments, the software preferably computes a signal energy of a specific set of data, such as data present in a next frame. The signal energy is computed from the samples, as is known in the art or described in the present document.

The methods of invention are now described in more detail. It will be recognized that the methods of the invention can be practiced by the program 132 of the invention. The method of the invention is for use with a device coupled between a network and at least one telephone line that exchange data between them.

Figure 2:
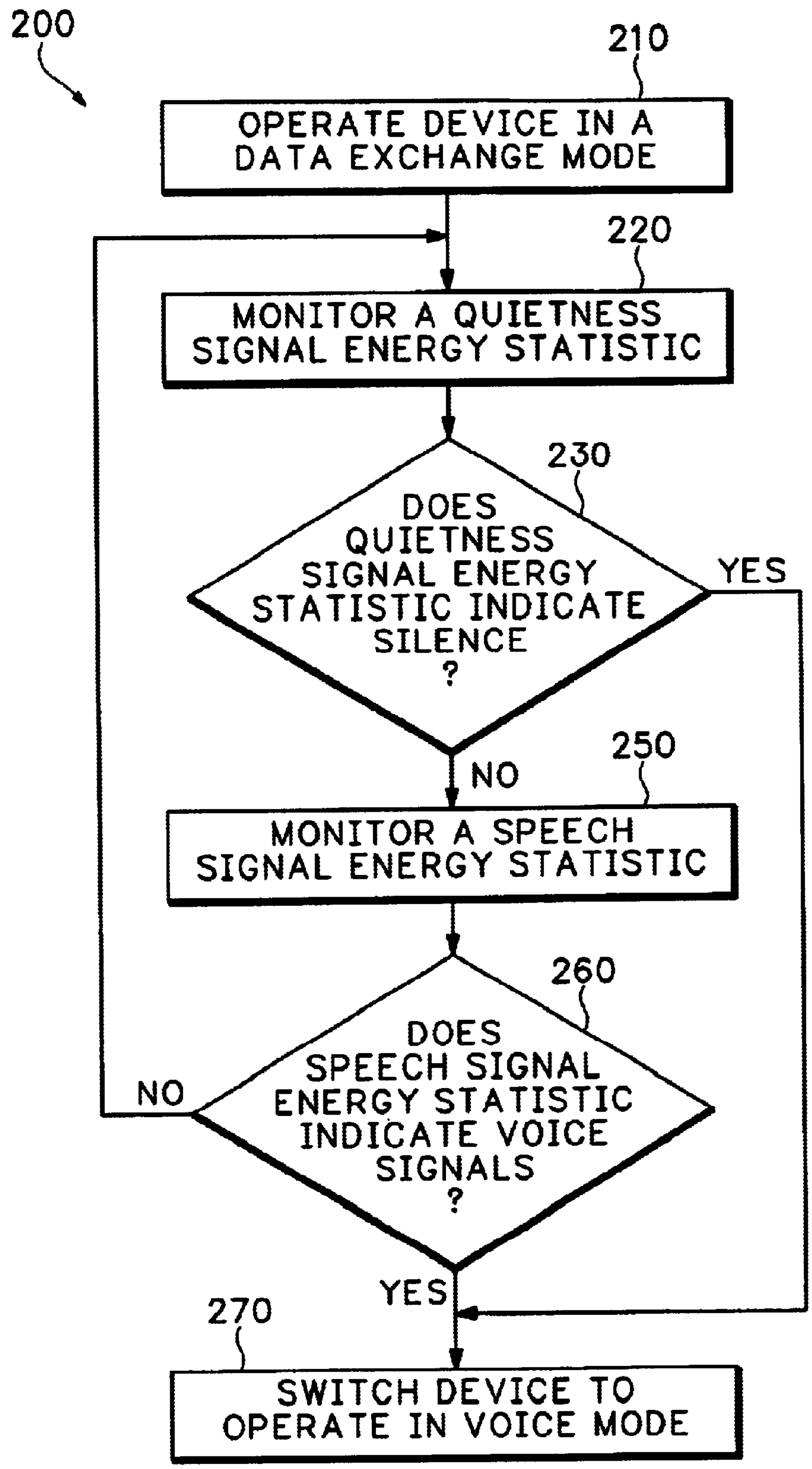
FIG. 2 is a flow chart for illustrating a first, composite method of the invention.

Referring now to FIG. 2, a flow chart 200 of the method of invention is described.

According to a box 210, the device is operated in the data exchange mode. This is a preferred feature but only optional, as the invention can be operated whether the device is operated in the data exchange mode or the voice mode. The device 100 is in this mode because the dial tone that established the telephone call was reported to a host of the device 100, which set the mode.

The flow chart 200 actually combines two component methods of the invention. One of the components, mainly described with boxes 220 and 230, is for monitoring for silence being encoded in the data. The other component, mainly described with boxes 250 and 260, is for monitoring for voice being encoded in the data.

To detect silence, according to a box 220, a quietness signal energy statistic of the exchanged data is monitored. According to a box 230, if it indicates silence, then according to a box 270, the device is switched to operate in the voice mode. In actuality, a signal or flag is given to a host, which then switches the device.

If, at box 230, silence is not indicated, then according to box 250 a speech signal energy statistic is monitored. Then, according to a box 260, if the speech signal energy statistic indicates that voice signals are encoded, execution reverts again to box 270.

It is preferred that both component methods are implemented. It will be recognized that they can be implemented in either order, or each one by themselves.

Each of the two particular component methods is now described. The silence detection method is described referring to FIG. 3, and the voice detection method is described referring to FIGS. 4 and 5.

In general, the silence detection method comprises updating the quietness signal energy statistic of the exchanged data, and incrementing a frames counter every time the quietness signal energy statistic remains below a preset threshold. If the frames counter exceeds a preset frames counter threshold, the method switches the device from a data transfer mode to a voice mode. Optionally and preferably, the frames counter is reset if the quietness signal energy statistic exceeds the preset frames counter threshold.

In general, the data is exchanged in frames, and updating includes counting a next number of samples of data of a next frame, and updating is performed as a function of the next number. In the preferred embodiment, the function of the next number is computed by computing a signal energy of the data present in the next frame.

Figure 3:
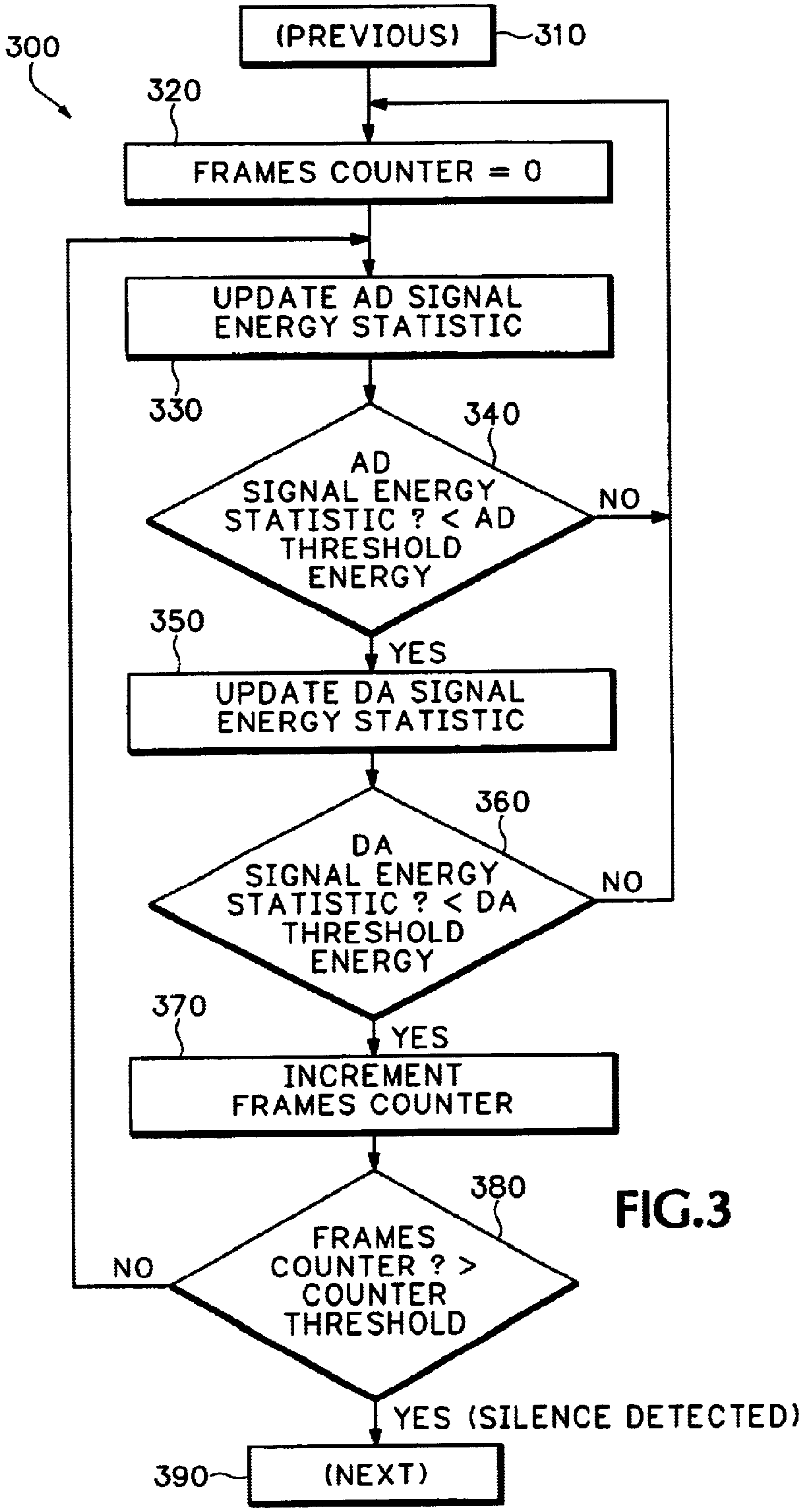
FIG. 3 is a flow chart for illustrating a first component of the method of FIG. 2.

Referring now more particularly to FIG. 3, a flow chart 300 is used for describing a preferred embodiment. In a fax call, there could be a half-duplex operation. Either the RX or the TX signal could be silence. Therefore both the RX and TX directions must be checked, in order to determine if there is silence on the line.

A box 310 stands for a previous operation, whatever that might be. For example, if the flow chart 300 is substituted for boxes 220 and 230 of FIG. 1, then the box 310 would correspond to box 210.

According to a box 320, if frames counter is set to 0.

According to a box 330, an AD signal energy statistic ADENGDB is updated from the samples of the data. This is preferably accomplished according to Equation (1) below:

$$ADENG=ADENG*(1-2^{-k})+ENERGYOFRXSIGNAL*2^{-k}, \quad \text{Equation (1)}$$

where k is an integer, and it is preferred to use k=2, and the energy of the RX signal is computed as per:

$$ENERGYOFRXSIGNAL=sum\_of\_square(rx) \quad \text{Equation (2)}$$

and, $$sum\_of\_square(rx)=rx[0]*rx[0]+ \ldots +rx[N-1]*rx[N-1] \quad \text{Equation (3)}$$

where N is the number of data in one frame, typically 80. In Equation (3), rx[m] is the value of the mth datum, also known as sample. Once computed, the new ADENG is converted to a dB value, as per:

$$ADENGDB=10*\log_{10}(ADENG) \quad \text{Equation (4)}$$

According to a box 340, the AD signal energy statistic is compared to an AD threshold energy. A suitable AD threshold energy is −46 dB.

If it is larger, it means that silence is not encoded, and execution reverts to box 320. If it is smaller, then according to box 350 a DA signal energy statistic DAENGDB is updated from the samples of the data. This is performed according to:

$$DAENG=DAENG*(1-2^{-k})+ENERGYOFTXSIGNAL*2^{-k}, \quad \text{Equation (5)}$$

using k=2, and the energy of the TX signal is computed as per $$ENERGYOFTXSIGNAL=sum\_of\_square(tx) \quad \text{Equation (6)}$$

and, $$sum\_of\_square(tx)=tx[0]*tx[0]+ \ldots +tx[N-1]*tx[N-1] \quad \text{Equation (7)}$$

where rx[m] is the value of the mth datum, also known as sample. Once computed, the new DAENG is converted to a dB value, as per:

$$DAENGDB=10*\log_{10}(DAENG) \quad \text{Equation (8)}$$

According to box 360, it is inquired whether the DA signal energy statistic is smaller than a DA threshold energy. A suitable DA threshold energy is −40 dB.

If larger, then execution reverts again to box 320. If smaller, then the frames counter is incremented according to box 370.

Then it is inquired whether the frames counter is larger than a preset frames counter threshold. The frames counter threshold is set so as to determine for how long a time window silence needs to be detected, before determining that the fax/modem transmission has ended. A suitable time window is 10 seconds long. The actual frames counter threshold is then determined from the frequency of the frames. For example, if there are 100 frames per second, then the frames counter threshold could be 1000.

If the frames counter is less than the threshold, then execution reverts to box 330, for more time to pass. If it meets or exceeds the threshold, then the method of the invention determines that silence has been detected, and execution continues to box 390.

Box 390 stands for a next operation, whatever that might be. For example, if the flow chart 300 is substituted for boxes 220 and 230 of FIG. 1, then box 390 would correspond to box 270.

Figure 4:
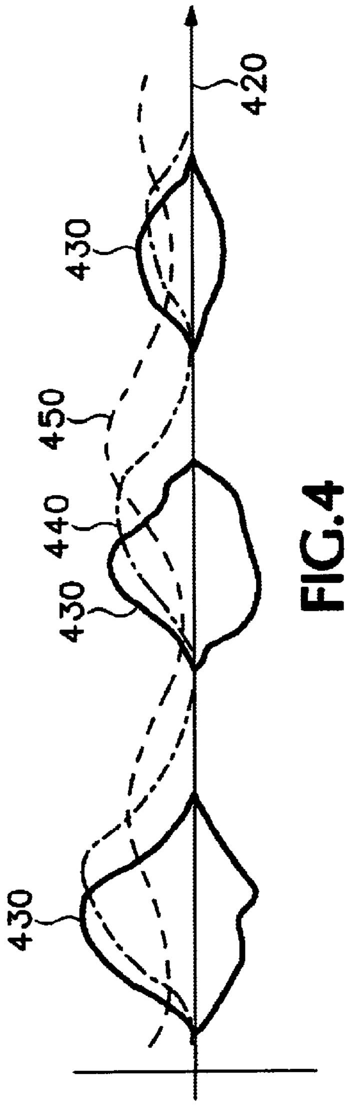
FIG. 4 is a diagram showing a typical plot of energy of samples of a stream of data that encode a voice signal.

For describing the voice detection method of the invention, reference is first made to FIG. 4. The horizontal axis 420 is a number indicative of data. Envelopes 430 are characteristic envelopes of peaks of values of data, or samples that encode voice signals.

In general, the voice detection method comprises monitoring a speech signal energy statistic of the exchanged data, and if the speech signal energy statistic indicates that voice signals are encoded, switching the device from a data transfer mode to a voice mode.

Optionally and preferably, the data is exchanged in frames, and monitoring includes counting a next number of samples of data present in a next frame. Then a fast-moving statistic 440 and a slow moving statistic 450 of the data are updated as a function of the next number.

Then a difference is updated between the fast moving statistic 440 and the slow moving statistic 450. If the updated difference exceeds a preset threshold difference, a crossings counter is incremented.

Preferably, an absolute value of the difference is monitored so that then the crossings counter detects when the fast moving statistic 440 crosses the slow moving statistic 450. This way the crossings counter affords a count for the envelopes 430.

If the incremented crossings counter exceeds a preset crossings counter threshold, the method indicates that voice signals are encoded in the data, and the device is switched from a data transfer mode to a voice mode.

The method of the invention optionally also includes other steps, such as resetting the crossings counter if the updated difference is below the preset crossings counter threshold difference. In addition, the fast-moving statistic 440 and the slow moving statistic 450 can be computed in terms of the signal energy of the data present in the next frame.

In addition, all this can be implemented in combination with the first component of the method described in FIG. 3.

Figure 5:
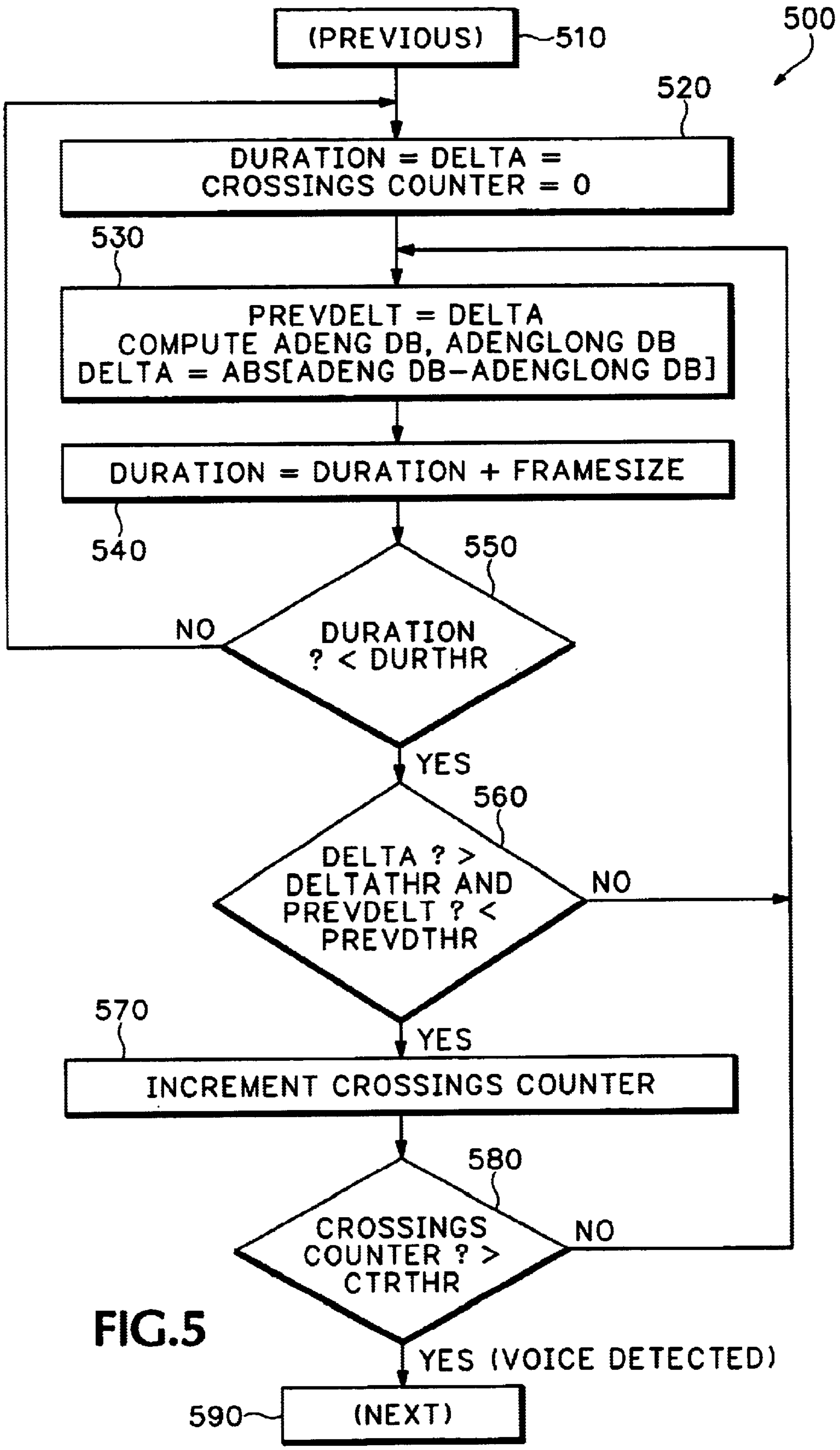
FIG. 5 is a flow chart for illustrating a second component of the method of FIG. 2, especially suited for determining a pattern of the type of FIG. 4.

Referring now to FIG. 5, a flow chart 500 is described for explaining the voice detection method of the invention. Box 510 stands for a previous operation. For example, if the flow chart of FIG. 5 were to be put in place of boxes 250 and 260 of FIG. 1, box 510 could be either box 230, or box 210, it steps 220 and 230 are not implemented.

Alternately, as will be appreciated by a person skilled in the art in view of this description, the first and second component methods of FIG. 2 can be implemented together. This means monitoring for the first, then monitoring for the second. Indeed, some of the computations for the first component of the method are identical, in their preferred form, to the computations for the second component of the method.

According to a box 520, initializations take place. A crossings counter is set to 0, a duration is set to 0, and an absolute difference delta is set to 0.

According to box 530, a variable of a previous difference (PREVDELTA) is given the value of the difference delta. In addition, the fast-moving statistic 440 and the slow moving statistic 450 are computed. Further, a new difference delta is computed as the absolute value of the difference between the fast-moving statistic 440 and the slow moving statistic 450.

Advantageously, the fast moving statistic 440, also known as short term statistic, can be defined to be identical to what was computed above as Equation (1), which is repeated below. Specifically, compute:

$$ADENG=ADENG*(1-2^{-k})+ENERGYOFRXSIGNAL*2^{-k}, \quad \text{Equation (1)}$$

using k=2, and from that the dB value is computed as per:

$$ADENGDB=10*\log_{10}(ADENG) \quad \text{Equation (4)}$$

The slow moving statistic 450, also known as the long term statistic is denoted as ADENGLONGDB. This can be advantageously computed by:

$$ADENGLONG=ADENGLONG*(1-2^{-k})+ENERGYOFRXSIGNAL*2^{-k}, \quad \text{Equation (9)}$$

using k=6. It will be appreciated that, other than the different value of k, the computation is identical as for Equation 1. From that, the dB value can be computed as per:

$$ADENGLONGDB=10*\log_{10}(ADENGLONG) \quad \text{Equation (10)}$$

Then, according to box 540, the duration variable is incremented by a frame size. As will be understood, the duration variable need not carry units of time since it corresponds to time anyway.

According to a next box 550, it is inquired whether the duration variable is smaller than a preset duration threshold. Again, the duration threshold is set as a number although it corresponds to time window. A suitable time window is five seconds long.

If not, execution reverts to step 520.

If yes, then according to a step 560, it is determined whether the fast-moving statistic 440 crosses the slow moving statistic 450. This is determined indirectly, by inquiring whether there is a very big energy change in the difference between the successive frames. This is determined by inquiring whether the difference delta is larger than a preset threshold delta, simultaneously with a previous delta being smaller than a preset threshold previous delta. A suitable value for the preset threshold delta and for the preset threshold previous delta is 6 dB.

If not, execution returned to box 530.

If yes, then according to box 570, the crossings counter is incremented.

Then, according to box 580, it is determined whether the crossings counter is larger than a crossings counter threshold. The crossings counter threshold is intended to measure the number of the envelopes 430 of FIG. 4. As such, its unit is not determined by time, but by number. A suitable crossings counter threshold is 10.

If not, execution reverts to box 530. If yes, it is determined that voice signals are encoded in the data.

Box 590 is similar to box 390 of FIG. 3, and can stand for box 270 of FIG. 2.

A person skilled in the art will be able to practice the present invention in view of the present description, where numerous details have been set forth in order to provide a more thorough understanding of the invention. In other instances, well-known features have not been described in detail in order not to obscure unnecessarily the invention. In interpreting this document, words should be accorded a meaning consistent with what is found in common non-technical dictionaries, and also in technical dictionaries for the art of the invention. In addition, the meanings of the words in this document can be augmented from their particular usage in this document, especially where this document expressly gives them a specific meaning.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A device for coupling between a network and a telephone line to exchange data between them, the device having a data transfer mode and a voice mode, the device comprising:

a codec for coupling to the telephone line; and a digital signal processing (DSP) unit coupled with the codec for coupling to the network; and a memory containing a program for use by the DSP unit for detecting when voice is encoded in the data to be exchanged, the program comprising:

software for counting a next number of samples of data in a next frame, software for updating a fast moving statistic and a slow moving statistic of the data from the next number, and for updating a difference between the fast moving statistic and the slow moving statistic, and for incrementing a crossings counter, if the updated difference exceeds a preset threshold difference, and software for switching the device from the data transfer mode to the voice mode if the software determines that the crossings counter exceeds a preset crossings counter threshold.

2. The device of claim 1, wherein the software is further for computing a signal energy of data present in a next frame.

3. A computer-readable medium containing a program for detecting when voice is encoded in data exchanged between a codec coupled to a telephone line and a digital signal processing unit coupled to a network, the program comprising:

software for counting a next number of samples of data in a next frame;

software for updating a fast moving statistic and a slow moving statistic of the data from the next number, and for updating a difference between the fast moving statistic and the slow moving statistic, and for incrementing a crossings counter, if the updated difference exceeds a preset threshold difference, and for determining whether the crossings counter exceeds a preset crossings counter threshold; and software for informing that voice has been detected if the software determines that the crossings counter exceeds the preset crossings counter threshold.

4. The computer-readable medium of claim 3, wherein the software is further for computing a signal energy of data present in a next frame.

5. The computer-readable medium of claim 3, wherein the software is further for resetting the crossings counter if the updated difference is below the preset crossings counter threshold difference.

6. For use with a device coupled between a network and at least one telephone line that exchange data between them, a method comprising:

monitoring a speech signal energy statistic of the exchanged data; and if the speech signal energy statistic indicates that voice signals are encoded, switching the device from a data transfer mode to a voice mode;

wherein the data is exchanged in frames, and wherein monitoring includes:

counting a next number of samples of data present in a next frame;

updating a fast moving statistic of the data as a function of the next number;

updating a slow moving statistic of the data as a function of the next number;

updating a difference between the fast moving statistic and the slow moving statistic;

if the updated difference exceeds a preset threshold difference, incrementing a crossings counter; and if the crossings counter exceeds a preset crossings counter threshold, indicating that voice signals are encoded.

7. The method of claim 6, further comprising:

resetting the crossings counter if the updated difference is below the preset crossings counter threshold difference.

8. The method of claim 6, further comprising:

computing a signal energy of the data present in the next frame.

* * * * *

UNITED STATES PATENT AND TRADEMARK OFFICE

CERTIFICATE OF CORRECTION

PATENT NO. : 6,757,301 B1
DATED : June 29, 2004
INVENTOR(S) : Tsai

It is certified that error appears in the above-identified patent and that said Letters Patent is hereby corrected as shown below:

Title page,
Assistant Examiner, "*John M. Waxman*" should read -- *Andrew Waxman* --.

Column 6,
Line 5, "+rx[N-1]*rx[N-Eq]uation (3)" should read -- +rx[N-1]*rx[N-1] Equation (3) --.
Line 30, "+tx[N-1]*tx[N-1E]quation (7)" should read -- +tx[N-1]*tx[N-1] Equation (7) --.

Signed and Sealed this

Eighth Day of February, 2005

JON W. DUDAS
*Director of the United States Patent and Trademark Office*